US012723123B2

(12) United States Patent
Malbertz et al.

(10) Patent No.: US 12,723,123 B2
(45) Date of Patent: Sep. 1, 2026

(54) PRODUCING ISOCYANATE-TERMINATED, URETHANE GROUP-CONTAINING PREPOLYMERS

(71) Applicant: Covestro Deutschland AG, Leverkusen (DE)

(72) Inventors: Christoph Malbertz, Herzogenrath (DE); Stefan Hirschfeld, Alpen (DE); Dieter Mager, Leverkusen (DE); Oswald Wilmes, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 495 days.

(21) Appl. No.: 18/266,036

(22) PCT Filed: Dec. 9, 2021

(86) PCT No.: PCT/EP2021/085056
§ 371 (c)(1),
(2) Date: Jun. 8, 2023

(87) PCT Pub. No.: WO2022/122957
PCT Pub. Date: Jun. 16, 2022

(65) Prior Publication Data

US 2024/0052085 A1 Feb. 15, 2024

(30) Foreign Application Priority Data

Dec. 9, 2020 (EP) .................................... 20212880

(51) Int. Cl.

| | |
|---|---|
| ***C08G 18/78*** | (2006.01) |
| ***C08G 18/02*** | (2006.01) |
| ***C08G 18/18*** | (2006.01) |
| ***C08G 18/32*** | (2006.01) |
| ***C09D 175/04*** | (2006.01) |

(52) U.S. Cl.
CPC ....... *C08G 18/022* (2013.01); *C08G 18/1875* (2013.01); *C08G 18/3206* (2013.01); *C08G 18/7837* (2013.01); *C08G 18/7843* (2013.01); *C09D 175/04* (2013.01); *C08G 2150/00* (2013.01)

(58) Field of Classification Search
CPC .............. C08G 18/022; C08G 18/1875; C08G 18/3206; C08G 18/7837; C08G 18/7843
See application file for complete search history.

(56) References Cited

U.S. PATENT DOCUMENTS

2010/0292396 A1* 11/2010 Binder .................. C08G 18/02 560/336
2020/0040124 A1* 2/2020 Azuma ................ C08G 18/027

FOREIGN PATENT DOCUMENTS

| | | | |
|---|---|---|---|
| EP | 0496208 | A2 | 7/1992 |
| JP | 2003321526 | A | 11/2003 |
| JP | 2015137316 | A | 7/2015 |
| JP | 201660778 | A | 4/2016 |
| JP | 2020147737 | A | 9/2020 |
| WO | 2019061019 | A1 | 4/2019 |

* cited by examiner

*Primary Examiner* — Michael L Leonard
(74) *Attorney, Agent, or Firm* — The Webb Law Firm

(57) ABSTRACT

The invention relates to a method for producing isocyanate-terminated, urethane group-containing prepolymers, comprising reacting a reaction mixture that contains a stoichiometric excess of at least one aliphatic and/or cycloaliphatic diisocyanate and a polyol composition having an OH number >400, characterized in that the reaction mixture is mixed with a specific power input of 0.5 kW/m3 to 40 kW/m3, relative to the total volume of the reaction mixture.

16 Claims, No Drawings

PRODUCING ISOCYANATE-TERMINATED, URETHANE GROUP-CONTAINING PREPOLYMERS

CROSS-REFERENCE TO RELATED APPLICATIONS

This application is the United States national phase of International Application No. PCT/EP2021/085056 filed Dec. 9, 2021, and claims priority to European Patent Application No. 20212880.7 filed Dec. 9, 2020, the disclosures of which are hereby incorporated by reference in their entireties.

BACKGROUND OF THE INVENTION

Field of the Invention

The present invention relates to a process for producing isocyanate-terminated, urethane group-containing prepolymers. Furthermore, the invention relates to the use of the thus produced prepolymers for the production of polyisocyanates containing isocyanurate and allophanate groups and having an average isocyanate functionality ≥4, and to a process for producing such polyisocyanates, to the polyisocyanates themselves and to the use of such polyisocyanates for producing elastic coatings.

Description of Related Art

Modification reactions of aliphatic diisocyanates have long been known. The resultant polyisocyanates are used as a crosslinker component in coating systems and adhesives. On the one hand, customary modification reactions are those in which the isocyanates react with themselves, resulting for example in the formation of biurets, isocyanurates, uretdiones or iminooxadiazinediones. On the other hand, the isocyanates can be reacted and thus oligomerized with polyols or polyamines with formation of urethane, allophanate and/or urea groups. What is crucial is the formation of higher molecular weight adducts that have a lower vapor pressure than the monomeric diisocyanates themselves. Unreacted diisocyanate is removed from the reaction mixture for example by thin-film distillation, leaving behind the polyisocyanate as bottom product which, if desired, can be diluted with solvent.

WO2019061019 describes polyisocyanates which are of excellent suitability for producing 2-component systems for elastic coatings, particularly so-called soft touch coatings. Features of these polyisocyanates include a high isocyanate functionality, i.e. a high average number of isocyanate groups per molecule, and a specific ratio of isocyanurate groups of the polyisocyanate to allophanate groups, the polyisocyanate preferably also containing oligomers in which isocyanurate and allophanate groups are present chemically bonded to one another, i.e. in the same molecule. Some of the isocyanurate groups here can also be present in the isomeric form as iminooxadiazinediones.

Similar polyisocyanates have also been described in EP0496208A2. A description is given here by way of example on a laboratory scale first of a urethanization reaction of a (cyclo)aliphatic diisocyanate with a monofunctional alcohol, and subsequently of a combined trimerization and allophanatization. Nothing is mentioned about the functionality of the resulting polyisocyanates.

However, the products produced by the processes of the prior art can have excessively high turbidity values, this limiting reliable use in the optically extremely demanding field of coating systems and finishes. This problem and ways of solving it are not addressed in the prior art.

SUMMARY OF THE INVENTION

It was then an object of the invention to provide a process which makes it possible to produce, in particular on an industrial scale, turbidity-free polyisocyanates that contain urethane groups and/or allophanate and isocyanurate groups and can be used in coating systems, for example for producing elastic coatings. In the present case, turbidity-free polyisocyanates are those polyisocyanates that have a turbidity of at most 2.0 NTU, determined by nephelometry in accordance with DIN EN ISO 7027-1:2016-11.

It has now surprisingly been found that the turbidity can be attributed to unfavorable reaction conditions during the urethanization reaction itself.

The invention relates in a first aspect to a process for producing isocyanate-terminated, urethane group-containing prepolymers, comprising reacting a reaction mixture containing a stoichiometric excess of at least one aliphatic and/or cycloaliphatic diisocyanate and a polyol composition having an OH number >400, where the reaction mixture is mixed with a specific power input in the range from 0.5 $kW/m^3$ to 40 $kW/m^3$, based on the total volume of the reaction mixture.

In a second aspect, the present invention relates to a process for producing polyisocyanates containing isocyanurate and allophanate groups and having an average isocyanate functionality ≥4, comprising the steps (1) producing an isocyanate-terminated, urethane group-containing prepolymer, (2) reacting the prepolymer obtained in step (1) in the presence of a catalyst with formation of isocyanurate and allophanate groups to form a polyisocyanate, (3) distillatively separating off monomeric diisocyanate from the polyisocyanate obtained in step (2), where steps (1) and (2) may be carried out in the stated order one after the other, partially simultaneously or simultaneously, characterized in that the isocyanate-terminated, urethane group-containing prepolymer is produced in step (1) by reacting a reaction mixture containing a stoichiometric excess of at least one aliphatic and/or cycloaliphatic diisocyanate and a polyol composition having an OH number >400, characterized in that the reaction mixture is mixed with a specific power input in the range from 0.5 $kW/m^3$ to 40 $kW/m^3$, based on the total volume of the reaction mixture.

In a third aspect, the present invention relates to a polyisocyanate containing isocyanurate and allophanate groups and having an average isocyanate functionality ≥4 and a turbidity, measured by means of nephelometry in accordance with DIN EN ISO 7027-1:2016-11, of at most 2.0 NTU, preferably at most 1.0 NTU and particularly preferably at most 0.5 NTU.

DESCRIPTION OF THE INVENTION

According to the invention, the terms “comprising” or “containing” preferably mean “consisting essentially of” and particularly preferably mean “consisting of”.

In the present case, the average OH functionality should be understood to mean the average number of OH groups per molecule. It can be calculated by dividing the total number of all OH groups of the polyols of which the polyol composition consists by the number of molecules in the polyol composition.

Analogously, the average isocyanate functionality should be understood to mean the average number of NCO groups per molecule. It is determined in the present case according to the following formula:

$$F_{(GPC)} = \frac{Mn_{(GPC)}}{\frac{100 \times 42}{\% \ NCO_{(Titr.)}}}$$

Here, the NCO content is given in % by weight and determined titrimetrically in accordance with DIN EN ISO 11909:2007-05 and the average molecular weight is determined by gel permeation chromatography (GPC) in accordance with DIN 55672-1:2016-03 using polystyrene as standard and tetrahydrofuran as eluent.

"At least one", as used herein, refers to 1 or more, for example 2, 3, 4, 5, 6, 7, 8, 9 or more. In connection with constituents of the compounds described herein, this figure refers not to the absolute number of molecules, but rather to the nature of the constituent. "At least one aliphatic and/or cycloaliphatic diisocyanate" therefore means, for example, that only one type of diisocyanate or a plurality of different types of diisocyanates may be present, without specifying the amount of the individual compounds.

Numerical values specified herein without decimal places each refer to the full value specified with one decimal place. For example, "99%" signifies "99.0%".

Numerical ranges given in the format "in/from x to y" include the values stated. If two or more preferred numerical ranges are given in this format, it is understood that all ranges arising from the combination of the various end points are likewise encompassed.

In the context of the present invention, the reaction of the reaction mixture is a urethanization reaction. This does not entirely rule out any secondary reactions that may take place to a small extent.

In the present case, the term "stoichiometric excess" refers to the final total amounts added of the at least one aliphatic and/or cycloaliphatic diisocyanate and of the polyol composition.

Suitable aliphatic or cycloaliphatic diisocyanates for the process according to the invention are for example selected from the group consisting of 1,4-diisocyanatobutane, 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 2,4- and 2,6-diisocyanato-1-methylcyclohexane, 1,3- and 1,4-bis(isocyanatomethyl) cyclohexane, 1-isocyanato-3,3,5-trimethyl-5-isocyanatomethylcyclohexane (isophorone diisocyanate, IPDI), 4,4'-diisocyanatodicyclohexylmethane, 2,4'-diisocyanatodicyclohexylmethane, 1-isocyanato-1-methyl-4(3)-isocyanatomethylcyclohexane, bis(isocyanatomethyl)norbornane and any desired mixtures thereof.

The aliphatic or cycloaliphatic diisocyanate is preferably selected from the group consisting of 1,5-diisocyanatopentane (PDI), 1,6-diisocyanatohexane (HDI), 1-isocyanato-3,3,5-trimethyl-5-isocyanatomethylcyclohexane (isophorone diisocyanate, IPDI), 4,4'-diisocyanatodicyclohexylmethane and any desired mixtures thereof.

Particularly preferably, the aliphatic or cycloaliphatic diisocyanate is a linear aliphatic diisocyanate selected from the group consisting of 1,5-diisocyanatopentane (PDI) and 1,6-diisocyanatohexane (HDI).

Instead of a single diisocyanate, a mixture of different diisocyanates may also be used in the process according to the invention. Preference is given, however, to the use of a single type of diisocyanate.

Suitable polyol compositions for the process according to the invention are those having an OH number >400. The alcohols contained may optionally contain further functional groups that are, however, unreactive toward isocyanates, such as ether groups. Preferably, the average OH functionality of the polyol composition is ≥2 and ≤8; particularly preferably, the average OH functionality of the polyol composition is ≥2 and ≤6; very particularly preferably, the average OH functionality of the polyol composition is ≥3 and ≤5.

The polyol composition preferably contains one or more mono- and/or polyols selected from the group consisting of methanol, ethanol, n-propanol, isopropanol, n-butanol, isobutanol, tert-butanol, n-pentanol, 2-pentanol, 3-pentanol, neopentyl alcohol, isomers of methylbutanol, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, furfuryl alcohol, trimethylolpropane, pentaerythritol, ethylene glycol, butane-1,2-diol, butane-1,3-diol, butane-1,4-diol, butane-2,3-diol, diethylene glycol, propane-1,2-diol, propane-1,3-diol, glycerol and polyols obtainable by alkoxylation, preferably by ethoxylation or propoxylation, of these polyols, particularly preferably by ethoxylation of these polyols. Particularly preferably, the polyol composition contains at least one polyol selected from the group consisting of trimethylolpropane, ethylene glycol, propane-1,2-diol, propane-1,3-diol, butane-1,3-diol, butane-1,4-diol, diethylene glycol and glycerol. Very particularly preferably, the polyol composition contains at least one polyol selected from the group consisting of trimethylolpropane, butane-1,3-diol, butane-1,4-diol and diethylene glycol.

In a preferred embodiment, these mono- or polyols amount to at least 95% by weight, preferably at least 99% by weight and particularly preferably at least 99.9% by weight, of the polyol composition. The polyol composition preferably does not contain any solvents that are unreactive toward isocyanate.

In a particularly preferred embodiment of the invention, the polyol composition consists of trimethylolpropane.

The process according to the invention is suitable preferably for reactions for producing isocyanate-terminated prepolymers on an industrial scale. In the present case, industrial scale should be understood to mean a batch size from 10 kg to 100 000 kg per batch, preferably 100 kg to 50 000 kg per batch, particularly preferably 500 kg to 30 000 kg per batch and very particularly preferably 1000 kg to 25 000 kg per batch, where the batch size relates to the total mass of the feedstocks in the reaction mixture.

Since the metering and conveying of solid substances on an industrial scale is usually difficult and therefore undesirable, it is advantageous to melt solid polyol compositions, such as the trimethylolpropane to be used with particular preference, before they are added into the reactor. This eliminates the handling of solid substances. Accordingly, in a further, preferred embodiment of the invention, the polyol composition is added in liquid form to the isocyanate.

The urethanization reaction may generally be carried out in any reactor deemed as suitable to those skilled in the art.

For example, a stirred vessel is suitable as reactor. Said stirred vessel is preferably a rotationally symmetric stirred vessel with a vertical main axis. The stirred vessel can have different diameters along this main axis, but is preferably essentially cylindrical. The bottom and top can be constructed, for example, with a dish-shaped or flat end. For temperature control, the stirred vessel can be provided with heat exchanger tubes, welded-on half-tube profiles and/or a double jacket, it being possible to configure the heat exchanger tubes either internally or externally. Said stirred vessel is preferably a baffled stirred vessel, i.e. a stirred vessel that has baffles, preferably baffles attached to the vessel wall. As an alternative or in addition, a partial stream of the reaction mixture can be removed from the reactor and temperature-controlled using an externally arranged heat exchanger before being fed back into the reactor, in order to control the temperature in the reactor in this way. Inlet and outlet connectors can be provided at any desired points on the wall, top and bottom of the stirred vessel.

To carry out the urethanization reaction, it is advantageous to charge the reactor first with diisocyanate and to heat it to a temperature in the range from 60° C. to 140° C., preferably in the range from 70° C. to 130° C. and particularly preferably in the range from 80° C. to 120° C. The urethanization reaction is preferably effected at a reaction temperature in this range. The polyol composition is then added, with thorough mixing of the reactor contents. As already mentioned previously, in the case of a polyol composition that is solid at room temperature, it is advantageous to add this composition in the form of a melt, in order to keep the requirements for the apparatuses and auxiliary units low.

In order to fulfill the feature essential to the invention that the reaction mixture is mixed with a specific power input in the range from 0.5 kW/$m^3$ to 40 kW/$m^3$, based on the total volume of the reaction mixture, the mixing may be effected in different ways. For example, it is possible to remove a partial stream from the reactor and to convey it back into the reactor again via a mixing device. This mixing device may for example be a rotor-stator mixer, a mixing nozzle, a static mixer, a stirred vessel or a pump, for example a centrifugal pump. The mixing and therefore the power input is preferably effected directly in the reaction vessel using a stirrer system. Preferably, the stirrer system is a stirrer mounted on a rotating axle, preferably an axially conveying stirrer, that can be of single-stage or multi-stage design depending on the H/D ratio (H=height of the liquid level in the reactor and D=internal diameter of the reactor). The higher the ratio, the more stirring stages are recommended.

The specific power input by the mixing here is in the range from 0.5 kW/$m^3$ to 40 kW/$m^3$, preferably in the range from 0.7 kW/$m^3$ to 10 kW/$m^3$ and particularly preferably in the range from 1 kW/$m^3$ to 5 kW/$m^3$, in each case based on the total volume of the reaction mixture. When using specific power inputs below the range according to the invention, the formation of insoluble solid particles was observed, which particles lead to turbidity of the reaction mixture and of the products produced therefrom. Higher specific power inputs on the one hand do not result in any further advantage and lead to the occurrence of high forces specifically on an industrial scale due to the viscosity of the reaction mixture, for which forces the corresponding apparatuses would have to be designed. The problem of turbidity arises to a particularly strong extent when the dynamic viscosity of the polyol composition, at the reaction temperature, is at least 4 times, preferably at least 6 times, particularly preferably at least 8 times, as great as that of the diisocyanate.

The stoichiometric excess is preferably selected such that there is an equivalent ratio of the total at least one aliphatic and/or cycloaliphatic diisocyanate present to the polyol composition in the range from 4:1 to 200:1, preferably in the range from 5:1 to 50:1.

A further subject of the invention is the use of the isocyanate-terminated, urethane group-containing prepolymer produced by the process according to the invention for producing polyisocyanates containing isocyanurate and allophanate groups and having an average isocyanate functionality ≥4. A further subject of the invention is also the use of specific power inputs from 0.5 kW/$m^3$ to 40 kW/$m^3$, preferably in the range from 0.7 kW/$m^3$ to 10 kW/$m^3$ and particularly preferably in the range from 1 kW/$m^3$ to 5 kW/$m^3$, in each case based on the total volume of the reaction mixture, in the case of urethanization reactions in a batch size from 10 kg to 100 000 kg per batch, preferably 100 kg to 50 000 kg per batch, particularly preferably 500 kg to 30 000 kg per batch and very particularly preferably 1000 kg to 25 000 kg per batch, where batch size relates to the total mass of the feedstocks in the urethanization reaction.

A further subject of the invention is a process for producing polyisocyanates containing isocyanurate and allophanate groups and having an average isocyanate functionality ≥4, comprising the steps (1) producing an isocyanate-terminated, urethane group-containing prepolymer (2) reacting the prepolymer obtained in step (1) in the presence of a catalyst with formation of isocyanurate and allophanate groups to form a polyisocyanate (3) separating off monomeric diisocyanate from the polyisocyanate obtained in step (2), where steps (1) and (2) may be carried out in the stated order one after the other, partially simultaneously or simultaneously, characterized in that the isocyanate-terminated, urethane group-containing prepolymer is produced in step (1) as described above.

By way of example, suitable catalysts for the reaction in step (2) are the catalysts stated in WO2019061019A1 on page 11, line 13 to page 13, line 11. Said catalysts are added either as such or dissolved in a suitable organic solvent in order to accelerate the formation of the isocyanurate and allophanate groups. Preferred catalyst solvents are those having groups that are reactive toward isocyanates and correspondingly being able to be incorporated into the polymer. By way of example, said solvents are mono- or polyhydric alcohols such as methanol, ethanol, n-propanol, isopropanol, n-butanol, n-hexanol, 2-ethyl-1-hexanol, ethylene glycol, propylene glycol, isomers of butanediol, 2-ethylhexane-1,3-diol, glycerol, ether alcohols such as 1-methoxy-2-propanol, 3-ethyl-3-hydroxymethyloxetane, tetrahydrofurfuryl alcohol, ethylene glycol monomethyl ether, ethylene glycol monobutyl ether, diethylene glycol monomethyl ether, diethylene glycol monoethyl ether, diethylene glycol monobutyl ether, diethylene glycol, dipropylene glycol, polyethylene glycols, polypropylene glycols, mixed polyethylene/polypropylene glycols and the monoalkyl ethers thereof, ester alcohols such as ethylene glycol monoacetate, propylene glycol monolaurate, glycerol diacetate, glycerol monobutyrate or 2,2,4-trimethylpentane-1,3-diol monoisobutyrate, unsaturated alcohols such as allyl alcohol, 1,1-dimethylallyl alcohol or oleyl alcohol, araliphatic alcohols such as benzyl alcohol or monosubstituted amides such as N-methylformamide, N-methylacetamide, cyanoacetamide or 2-pyrrolidinone or mixtures of such solvents.

The reaction in step (2) is preferably effected under an inert gas atmosphere at a temperature in the range from 0° C. to 150° C., preferably in the range between 20° C. and 130° C. and particularly preferably between 40° C. and 120° C. While the urethanization reaction to form the prepolymer in step (1) usually takes place spontaneously under these conditions, the reaction to form isocyanurate and allophanate groups is effected essentially only after addition of an appropriate catalyst.

Once the desired degree of conversion has been reached, the reaction is stopped. This can be effected by cooling the reaction mixture, for example. Preferably, the stopping is effected by adding a catalyst poison and optionally subsequent heating of the reaction mixture to a temperature above 80° C. Suitable catalyst poisons (stoppers) are known to those skilled in the art. By way of example, said catalyst poisons are hydrochloric acid, phosphoric acid, phosphonic acid, carbonyl chlorides such as acetyl chloride, benzoyl chloride or isophthaloyl dichloride, sulfonic acids or sulfonic esters, such as methanesulfonic esters, p-toluenesulfonic acid, trifluoromethanesulfonic acid, perfluorobutanesulfonic acid, dodecylbenzenesulfonic acid, methyl p-toluenesulfonate, ethyl p-toluenesulfonate, mono- or dialkyl phosphates such as tridecyl phosphate, dibutyl phosphate, dioctyl phosphate, or silylated acids such as trimethylsilyl methanesulfonate, trimethylsilyl trifluoromethansulfonate, tris(trimethylsilyl) phosphate or diethyl trimethylsilyl phosphate.

The amount of catalyst poison needed to stop the reaction depends essentially on the amount of catalyst used. In principle, an equivalent amount of stopper is required; however, since some of the catalyst is usually deactivated in some other way, a smaller amount of stopper may also be sufficient.

It is also possible to add the catalyst poison as such or in solution, the catalyst solvents listed previously for example being suitable as solvent. In addition to these solvents, the starting isocyanates may also be used as solvent for the catalyst poisons.

Once the reaction has been ended, monomeric diisocyanate is separated off from the reaction product. This is preferably effected distillatively, for example at a pressure below 5 mbar, preferably below 1 mbar and particularly preferably below 0.5 mbar and for example at a temperature in the range from 100° C. to 200° C., preferably in the range from 120° C. to 180° C. The residual content of monomeric diisocyanate after the distillation is preferably ≤0.50% by weight, particularly preferably ≤0.3% by weight and particularly preferably ≤0.2% by weight.

Such polyisocyanates containing isocyanurate and allophanate groups and having an average isocyanate functionality ≥4 that are obtainable or produced by the process according to the invention are a further subject of the invention.

The polyisocyanates containing isocyanurate and allophanate groups according to the invention have a turbidity, measured by means of nephelometry in accordance with DIN EN ISO 7027-1:2016-11, of at most 2.0 NTU, preferably at most 1.0 NTU and particularly preferably at most 0.5 NTU, where the polyisocyanate has a residual monomer content in accordance with DIN EN ISO 10283:2007-11 of preferably ≤0.50% by weight, particularly preferably ≤0.3% by weight and very particularly preferably ≤0.2% by weight. The NCO content of these polyisocyanates is preferably 15% by weight to 25% by weight measured by titration in accordance with DIN EN ISO 11909:2007-05. It is likewise preferable for the residual content of monomeric diisocyanate ≤0.50% by weight, particularly preferably ≤0.3% by weight and particularly preferably ≤0.2% by weight, measured in accordance with DIN EN ISO 10283:2007-11 by gas chromatography with an internal standard.

If required, a solvent may also be used to reduce the viscosity of the polyisocyanate containing isocyanurate and allophanate groups according to the invention. By way of example, suitable solvents are those known as paint solvents, such as ethyl acetate, butyl acetate, ethylene glycol monoethyl ether acetate, 1-methoxy-2-propyl acetate, 3-methoxy-n-butyl acetate, acetone, 2-butanone, 4-methyl-2-pentanone, cyclohexanone, toluene, xylene, chlorobenzene, benzine, solvent naphtha, carbonic esters such as dimethyl carbonate, diethyl carbonate, 1,2-ethylene carbonate, 1,2-propylene carbonate, lactones such as β-propiolactone, γ-butyrolactone, ε-caprolactone or ε-methylcaprolactone, but also solvents such as propylene glycol diacetate, diethylene glycol dimethyl ether, dipropylene glycol dimethyl ether, diethylene glycol monoethyl ether acetate, diethylene glycol monobutyl ether acetate, N-methylpyrrolidone or N-methylcaprolactam. Use may also be made of any desired mixtures of the solvents mentioned by way of example above.

The polyisocyanates containing isocyanurate and allophanate groups according to the invention are particularly suitable for use in a two-component system that is a further subject of the invention.

The two-component system according to the invention contains a component A), comprising at least one NCO-reactive compound, and a component B), comprising at least one polyisocyanate containing isocyanurate and allophanate groups according to the invention. The at least one NCO-reactive compound is preferably a polyol, particularly preferably at least one polyol having a hydroxyl functionality between ≥2 and ≤5. In addition, further polyols and additives, such as defoamers, matting agents, catalysts, stabilizers, antioxidants, biocides, fillers, color pigments, inorganic or organic pigments, leveling aids, light stabilizers, dispersants, thickeners, adhesives, inhibitors, catalysts, emulsifiers and/or other auxiliaries, may be present, it being possible for these optional compounds to be present in component A) and/or in component B).

If required, a solvent may also be used to reduce the viscosity of the polyol or of the mixed two-component system. By way of example, suitable solvents are those known as paint solvents, such as ethyl acetate, butyl acetate, ethylene glycol monoethyl ether acetate, 1-methoxy-2-propyl acetate, 3-methoxy-n-butyl acetate, acetone, 2-butanone, 4-methyl-2-pentanone, cyclohexanone, toluene, xylene, chlorobenzene, benzine, solvent naphtha, carbonic esters such as dimethyl carbonate, diethyl carbonate, 1,2-ethylene carbonate, 1,2-propylene carbonate, lactones such as β-propiolactone, γ-butyrolactone, ε-caprolactone or ε-methylcaprolactone, but also solvents such as propylene glycol diacetate, diethylene glycol dimethyl ether, dipropylene glycol dimethyl ether, diethylene glycol monoethyl ether acetate, diethylene glycol monobutyl ether acetate, N-methylpyrrolidone, N-methylcaprolactam or water.

The two-component system according to the invention may preferably be used to coat substrates. Therefore, a further subject of the present invention is a coating obtainable or produced by reacting the two-component system according to the invention or by reacting the polyisocyanate containing isocyanurate and allophanate groups according to the invention with a component that is reactive toward isocyanate groups, where the respective reaction is effected under the action of heat and/or actinic radiation and/or in the presence of one or more catalysts. The coating is preferably an elastic coating.

To this end, the two-component coating system is preferably applied to the optionally pretreated, for example primed, substrate and cured for example by heating. The composite composed of a substrate and the coating according to the invention, preferably the elastic coating according to the invention, is a further subject of the present invention.

EXAMPLES

All percentages are based on weight, unless stated otherwise.

NCO contents were determined titrimetrically in accordance with DIN EN ISO 11909:2007-05.

Residual monomer contents were measured in accordance with DIN EN ISO 10283:2007-11 by gas chromatography with an internal standard.

Turbidity was determined by nephelometry in accordance with DIN EN ISO 7027-1:2016-11.

Comparative Example 1

1500 kg of hexamethylene diisocyanate (HDI) was initially charged into a 3 $m^3$ stirred reactor, equipped with a multi-stage pulse countercurrent stirrer (MIG), under a nitrogen atmosphere and adjusted to a temperature of 105° C. At this temperature, 150 kg of a melt of trimethylolpropane was added with stirring. The specific power input was 0.25 kW/$m^3$ based on the total volume of the reaction mixture. About 2 hours after the end of the addition, the urethanization reaction was ended and the reactor temperature was lowered to 95° C. A sample of the prepolymer obtained was taken and subjected to a visual inspection. The result was clearly visible turbidity due to suspended matter. The trimerization and allophanatization reaction was then started by adding a 0.5% trimethylbenzylammonium hydroxide solution in 2-ethylhexanol. When an NCO value of 36% had been reached, the reaction was ended by adding a stopper solution (10% dibutyl phosphate in HDI) at a weight ratio of 100 parts catalyst solution to 3 parts stopper solution. Stirring was continued for a further 30 minutes at 95° C. and the remaining monomeric HDI was then separated off in a short-path evaporator at 140° C. and 0.1 mbar. The directly obtained process product had a turbidity of 2.6 NTU, an NCO content of 19.5% and a residual monomer content of 0.09%. No reduction in turbidity was able to be determined even after diluting with butyl acetate to an 80% by weight polyisocyanate content in the diluted product.

Example 1

Comparative Example 1 was repeated, with the difference that the stirrer speed was increased so that a specific power input of 2.2 kW/$m^3$, based on the total volume of the reaction mixture, was used. The directly obtained process product had a turbidity of 0.29 NTU, an NCO content of 19.3% and a residual monomer content of 0.17%. It was not possible to determine a greater turbidity for the product diluted with butyl acetate to an 80% by weight polyisocyanate content either.

Example 2

Example 1 was repeated, with the difference that the stirrer speed was reduced so that a specific power input of 0.8 kW/$m^3$, based on the total volume of the reaction mixture, was used. The directly obtained process product had a turbidity of 0.45 NTU, an NCO content of 19.5% and a residual monomer content of 0.20%. It was not possible to determine a greater turbidity for the product diluted with butyl acetate to an 80% by weight polyisocyanate content either.

The invention claimed is:

1. A process for producing isocyanate-terminated, urethane group-containing prepolymers, comprising reacting a reaction mixture containing a stoichiometric excess of at least one aliphatic and/or cycloaliphatic diisocyanate and a polyol composition having an OH number >400, where the reaction mixture is mixed with a specific power input in the range from 0.5 kW/$m^3$ to 40 kW/$m^3$, based on the total volume of the reaction mixture, wherein the reaction is carried out in a batch size from 1000 kg to 100 000 kg per batch, where the batch size relates to the total mass of the feedstocks in the reaction mixture.

2. The process as claimed in claim 1, wherein the at least one aliphatic and/or cycloaliphatic diisocyanate is selected from the group consisting of 1,4-diisocyanatobutane, 1,5-diisocyanatopentane, 1,6-diisocyanatohexane, 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 2,4- and 2,6-diisocyanato-1-methylcyclohexane, 1,3- and 1,4-bis(isocyanatomethyl)cyclohexane, 1-isocyanato-3,3,5-trimethyl-5-isocyanatomethylcyclohexane, 4,4'-diisocyanatodicyclohexylmethane, 2,4'-diisocyanatodicyclohexylmethane, 1-isocyanato-1-methyl-4 (3)-isocyanatomethylcyclohexane, bis(isocyanatomethyl) norbornane and any desired mixtures thereof.

3. The process as claimed in claim 1, wherein the polyol composition has an average OH functionality ≥2 and ≤8.

4. The process as claimed in claim 1, wherein the polyol composition contains at least one polyol selected from the group consisting of trimethylolpropane, ethylene glycol, propane-1,2-diol, propane-1,3-diol, butane-1,3-diol, butane-1,4-diol, diethylene glycol and glycerol.

5. The process as claimed in claim 1, wherein the reaction is carried out in a stirred vessel and the specific power input is effected by mixing with a stirrer system.

6. The process as claimed in claim 1, wherein the stoichiometric excess is selected such that an equivalent ratio of the total at least one aliphatic and/or cycloaliphatic diisocyanate present to the polyol composition is in the range from 4:1 to 200:1.

7. The process as claimed in claim 1, wherein the reaction mixture is reacted at a reaction temperature in the range from 60° C. to 140° C.

8. A method for producing polyisocyanates containing isocyanurate and allophanate groups and having an average isocyanate functionality ≥4 comprising providing an isocyanate-terminated, urethane group-containing prepolymer produced as claimed in claim 1.

9. A process for producing polyisocyanates containing isocyanurate and allophanate groups and having an average isocyanate functionality ≥4, comprising the steps (1) producing an isocyanate-terminated, urethane group-containing prepolymer, (2) reacting the prepolymer obtained in step (1) in the presence of a catalyst with formation of isocyanurate and allophanate groups to form a polyisocyanate, (3) distillatively separating off monomeric diisocyanate from the polyisocyanate obtained in step (2), where steps (1) and (2) are carried out in the stated order one after the other, partially simultaneously or simultaneously, wherein the isocyanate-terminated, urethane group-containing prepolymer is produced in step (1) as claimed in claim 1.

10. A polyisocyanate containing isocyanurate and allophanate groups and having an average isocyanate functionality ≥4 and a turbidity, measured by means of nephelometry in accordance with DIN EN ISO 7027-1:2016-11, of at most 2.0 NTU, where the polyisocyanate has a residual monomer content in accordance with DIN EN ISO 10283:2007-11 of ≤0.50% by weight.

11. A method of preparing a two-component system comprising providing a polyisocyanate produced as claimed in claim 9.

12. A two-component system, containing a component A), comprising at least one NCO-reactive compound, and a component B), comprising at least one polyisocyanate as claimed in claim 10.

13. A coating obtainable or produced by reacting a two-component system as claimed in claim 12, where the reaction is effected under the action of heat and/or actinic radiation and/or in the presence of one or more catalysts.

14. A composite composed of a substrate and a coating as claimed in claim 13.

15. The process as claimed in claim 5, wherein the specific power input is effected by mixing with an axially conveying stirrer.

16. A coating obtainable or produced by reacting a polyisocyanate containing isocyanurate and allophanate groups as claimed in claim 10 with a component that is reactive toward isocyanate groups, where the reaction is effected under the action of heat and/or actinic radiation and/or in the presence of one or more catalysts.

* * * * *